US012631232B2

(12) United States Patent
Philpott

(10) Patent No.: US 12,631,232 B2
(45) Date of Patent: May 19, 2026

(54) BRAKE ASSEMBLY AND METHOD OF CONTROL

(71) Applicant: ArvinMeritor Technology, LLC, Troy, MI (US)

(72) Inventor: Daniel Philpott, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 668 days.

(21) Appl. No.: 17/950,673

(22) Filed: Sep. 22, 2022

(65) Prior Publication Data

US 2024/0102524 A1     Mar. 28, 2024

(51) Int. Cl.
| | |
|---|---|
| *F16D 65/56* | (2006.01) |
| *F16D 65/18* | (2006.01) |
| *F16D 125/32* | (2012.01) |

(52) U.S. Cl.
CPC ........... *F16D 65/567* (2013.01); *F16D 65/18* (2013.01); *F16D 2125/32* (2013.01)

(58) Field of Classification Search
CPC .... F16D 65/183; F16D 65/0081; F16D 65/18; F16D 65/567; F16D 65/0025; F16D 55/226; F16D 2055/0037; F16D 2055/002; F16D 2121/02; F16D 2121/14; F16D 2125/06; F16D 2125/32
USPC ....................................... 188/71.9
See application file for complete search history.

(56) References Cited

U.S. PATENT DOCUMENTS

| | | | |
|---|---|---|---|
| 1,089,529 | A | 3/1914 | Brissenden |
| 4,491,203 | A | 1/1985 | Monick |
| 4,620,617 | A | 11/1986 | Weber |
| 4,690,253 | A | 9/1987 | Weber |
| 4,958,654 | A | 9/1990 | Hoffman, Jr. et al. |
| 6,276,494 | B1 | 8/2001 | Ward et al. |
| 6,354,407 | B1 | 3/2002 | Heinlein et al. |
| 6,607,059 | B1 | 8/2003 | Kapaan et al. |
| 6,659,236 | B1 | 12/2003 | Clark et al. |
| 6,691,837 | B1 | 2/2004 | Kapaan et al. |
| 9,599,177 | B2 | 3/2017 | Yasui et al. |
| 2003/0085082 | A1 | 5/2003 | Severinsson et al. |
| 2003/0173164 | A1 | 9/2003 | Angerfors |
| 2005/0284709 | A1 | 12/2005 | Sandberg |
| 2012/0325596 | A1 | 12/2012 | Malki et al. |
| 2013/0008749 | A1 | 1/2013 | Sandberg et al. |
| 2013/0256076 | A1 | 10/2013 | Malki et al. |

(Continued)

FOREIGN PATENT DOCUMENTS

| | | |
|---|---|---|
| DE | 10260597 A1 | 7/2004 |
| DE | 102006020550 A1 | 1/2008 |

(Continued)

OTHER PUBLICATIONS

Extended European Search Report dated Feb. 14, 2024, for European Application No. 23197261.3; 9 pages.

*Primary Examiner* — Nicholas J Lane
*Assistant Examiner* — San M Aung
(74) *Attorney, Agent, or Firm* — Dickinson Wright PLLC

(57) ABSTRACT

A brake assembly and a method of control. The brake assembly includes a wrap spring that is configured to slip with respect to a piston but not slip with respect to a shaft when the wrap spring is rotated in a first rotational direction. The wrap spring is configured to slip with respect to a shaft but not slip with respect to the piston when the wrap spring is rotated in a second rotational direction.

18 Claims, 7 Drawing Sheets

(56)          References Cited

U.S. PATENT DOCUMENTS

| | | |
|---|---|---|
| 2015/0354645 A1 | 12/2015 | Cann |
| 2016/0017946 A1* | 1/2016 | Sandberg ........... F16D 55/2265 |
| | | 188/71.8 |
| 2016/0215834 A1* | 7/2016 | Knoop ................. F16D 65/567 |
| 2016/0215841 A1 | 7/2016 | Cleary et al. |
| 2017/0122394 A1* | 5/2017 | Sandberg ............. F16D 65/567 |
| 2017/0175837 A1 | 6/2017 | Pehle et al. |
| 2019/0024740 A1* | 1/2019 | Taylor .................... F16D 65/52 |
| 2019/0024742 A1* | 1/2019 | Taylor .................. F16D 65/183 |
| 2019/0063530 A1 | 2/2019 | Kulkarni et al. |
| 2019/0329754 A1 | 10/2019 | Raveendrappa et al. |
| 2019/0331181 A1 | 10/2019 | Kulkarni et al. |
| 2019/0331184 A1 | 10/2019 | Taylor et al. |
| 2019/0331185 A1 | 10/2019 | Shah et al. |
| 2022/0080940 A1 | 3/2022 | Philpott |
| 2022/0089139 A1 | 3/2022 | Sakhare et al. |
| 2022/0090643 A1* | 3/2022 | Philpott ............... F16D 65/567 |

FOREIGN PATENT DOCUMENTS

| | | | |
|---|---|---|---|
| DE | 102008037774 B3 | 2/2010 | |
| EP | 0190453 A2 | 8/1986 | |
| EP | 3581448 A1 * | 12/2019 | ............ F16D 65/40 |
| GB | 2474301 A | 4/2011 | |

* cited by examiner

BRAKE ASSEMBLY AND METHOD OF CONTROL

TECHNICAL FIELD

This document relates to a brake assembly and a method of control.

BACKGROUND

A brake assembly is disclosed in U.S. Patent Publication No. 2019/0024742.

SUMMARY

In at least one embodiment a brake assembly is provided. The brake assembly includes a brake caliper, a tappet, a piston, and a wear adjuster mechanism. The tappet is moveable along an axis with respect to the brake caliper. The tappet is adapted to engage a brake pad assembly. The tappet has an inner thread. The piston is rotatable about the axis and is at least partially received in the tappet. The piston has an outer thread that mates with the inner thread. The wear adjuster mechanism is at least partially received inside the piston. The wear adjuster mechanism includes a shaft and a wrap spring. The shaft is rotatable about the axis. The wrap spring is received inside the piston and encircles the shaft. The wrap spring engages the piston and the shaft. The wrap spring is configured to slip with respect to the piston but not slip with respect to the shaft when the wrap spring is rotated in a first rotational direction. The wrap spring is configured to slip with respect to the shaft but not slip with respect to the piston when the wrap spring is rotated in a second rotational direction. The first rotational direction is disposed opposite the second rotational direction.

The wrap spring may contact the piston and the shaft. A first amount of surface area of the wrap spring that contacts the piston may be greater than a second amount of surface area of the wrap spring that contacts the shaft.

The piston may have a piston hub. The piston hub may be disposed opposite the outer thread. The piston hub may protrude toward the axis. The wrap spring may engage the piston hub.

The piston may have a piston wall. The piston wall may be disposed opposite the outer thread. The piston wall may protrude further toward the axis than the piston hub. The wrap spring may engage the piston wall.

The brake assembly may include a first bearing assembly. The first bearing assembly may be disposed inside the piston. The first bearing assembly may rotatably support the piston with respect to the shaft. The wrap spring may extend from the first bearing assembly.

The piston may have a first piston end and a second piston end disposed opposite the first piston end. The piston hub may be spaced apart from the first piston end. The piston hub may be spaced apart from the second piston end. The piston hub may extend from the piston wall toward the first piston end.

The shaft may have a shaft hub. The shaft hub may protrude away from the axis. The wrap spring may engage the shaft hub. The shaft hub may extend from the first bearing assembly. The shaft hub may be axially offset from the piston hub such that the piston hub does not encircle the shaft hub.

The shaft may have a first shaft end and a second shaft end. The second shaft end may be disposed opposite the first shaft end. The shaft hub may be spaced apart from the first shaft end and the second shaft end.

The shaft may have an intermediate shaft surface. The intermediate shaft surface may face away from the axis. The shaft hub may extend further away from the axis than the intermediate shaft surface extends from the axis. The intermediate shaft surface may extend from the shaft hub toward the second piston end. The wrap spring may encircle the intermediate shaft surface. The wrap spring may be spaced apart from the intermediate shaft surface. The piston hub may encircle the intermediate shaft surface. The piston hub may be spaced apart from the intermediate shaft surface.

The brake assembly may include a second bearing assembly. The second bearing assembly may be disposed inside a yoke. The second bearing assembly may rotatably support the shaft with respect to the yoke. The wrap spring may be the only component that is positioned between the piston and the shaft that is axially positioned between the first bearing assembly and the yoke and that is positioned closer to the axis than the piston and further from the axis than the shaft.

In at least one embodiment a method of controlling a brake assembly is provided. The method includes rotating a shaft in a first rotational direction about an axis. The shaft is disposed inside of a piston that is rotatable about the axis and that is received in a tappet. The tappet is moveable along the axis with respect to a brake caliper and is adapted to engage a brake pad assembly. The tappet and the piston have mating inner and outer threads, respectively. A wrap spring is received inside the piston and engages the piston and the shaft. The wrap spring engages the piston and the shaft. Rotating the shaft and the first rotational direction may tighten the wrap spring against the shaft such that the wrap spring does not slip with respect to the shaft and such that the wrap spring slips with respect to the piston when sufficient torque is applied to the shaft in the first rotational direction.

The method may include rotating the shaft in a second rotational direction that is disposed opposite the second rotational direction. Rotating the shaft in the second rotational direction tightens the wrap spring against the piston such that the wrap spring does not slip with respect to the piston and such that the wrap spring slips with respect to the shaft when sufficient torque is applied to the shaft in the second rotational direction.

The wrap spring slips with respect to the piston when a first amount of torque is applied in the first rotational direction. The wrap spring slips with respect to the shaft when a second amount of torque is applied in the second rotational direction. The second amount of torque is less than the first amount of torque.

3

Figure 6:
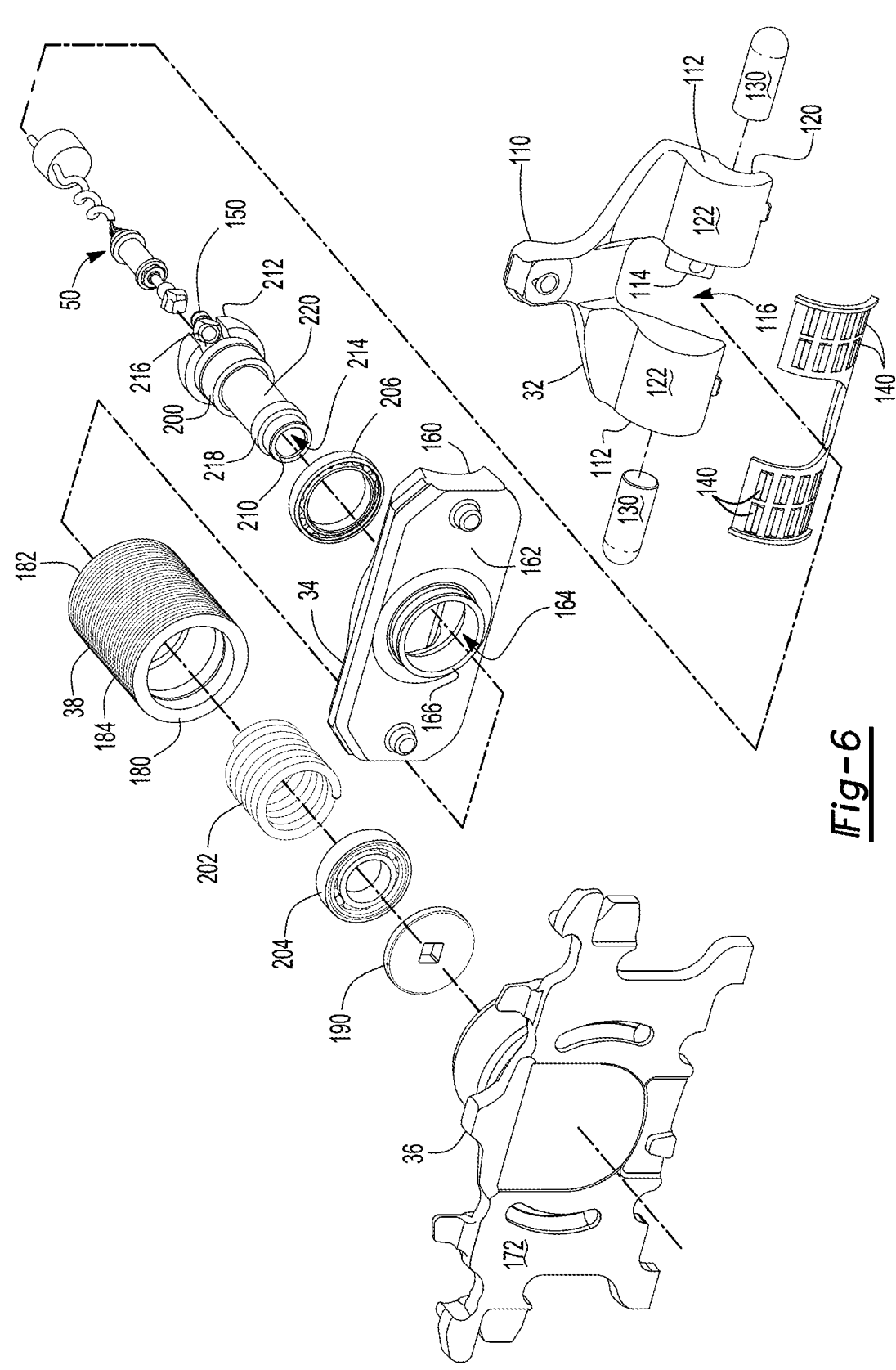
Figure 7:
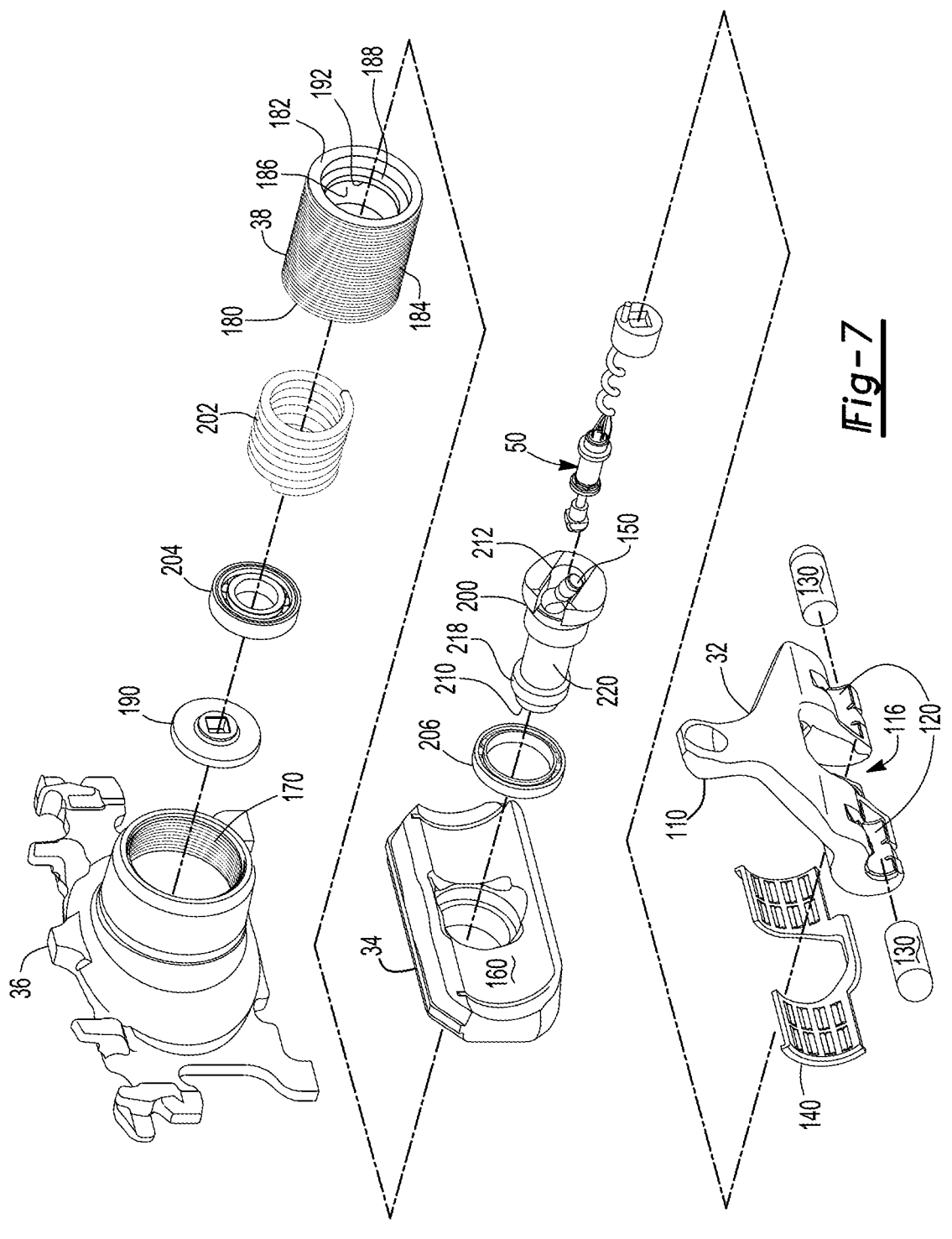

FIGS. 6 and 7 are exploded views of a portion of the brake assembly.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
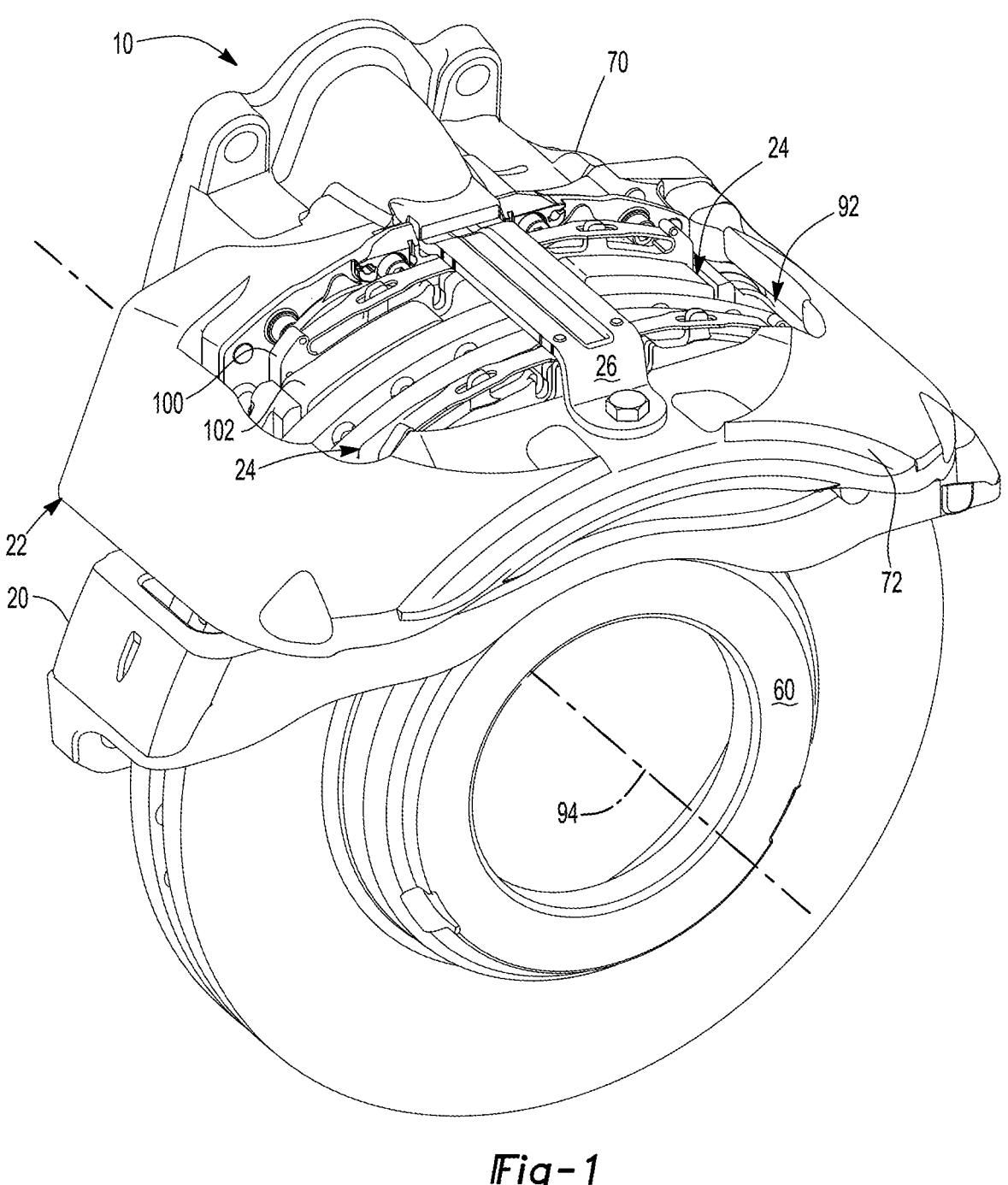
FIG. 1 is a perspective view of an example of a brake assembly.

Referring to FIG. 1, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels.

Figure 4:
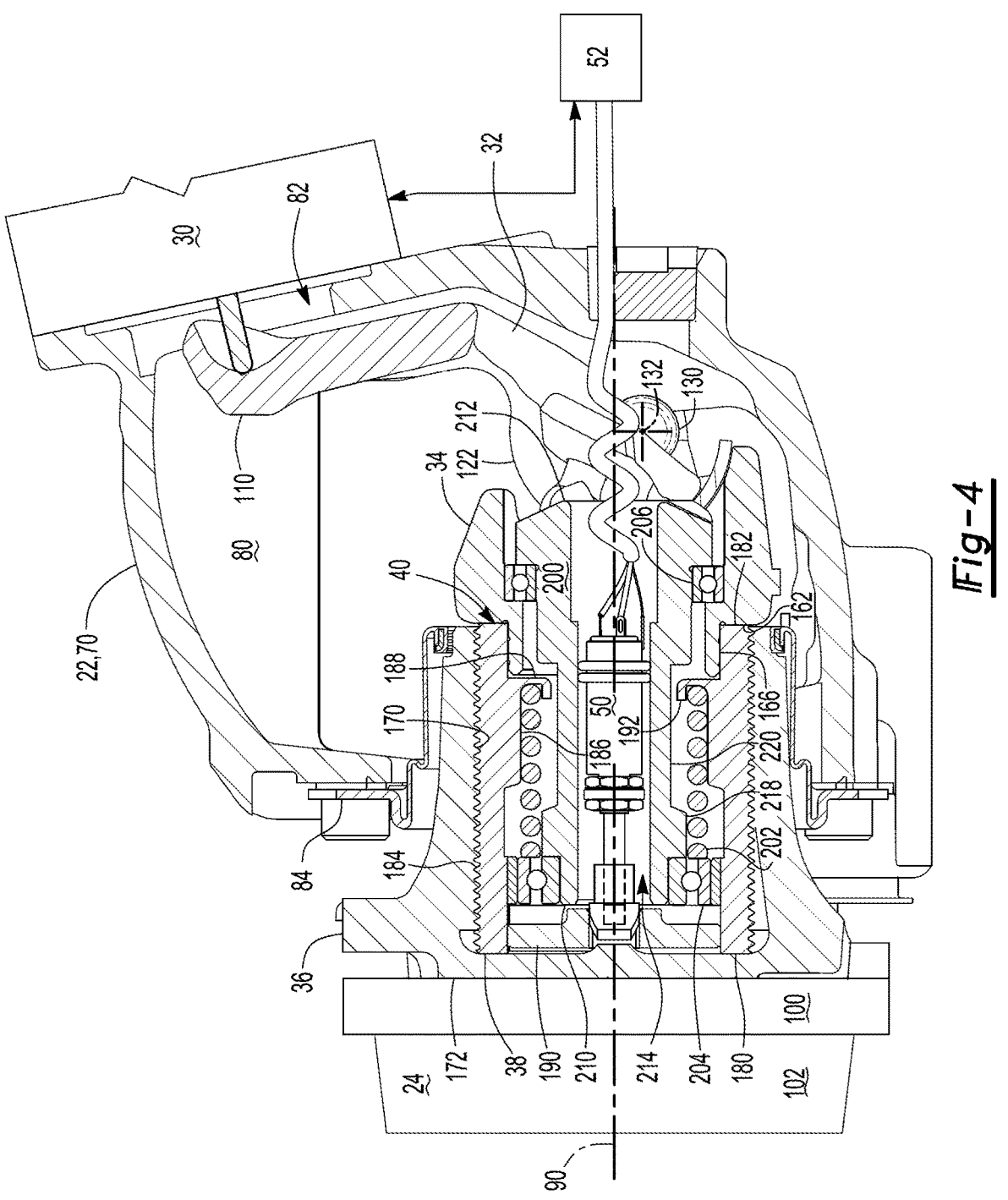
FIG. 4 is a section view of a portion of the brake assembly along section line 4-4 showing a tappet in a first position.

The brake assembly 10 is configured as a disc brake. In at least one configuration, the brake assembly 10 includes a brake carrier 20, a brake caliper 22, a pair of brake pad assemblies 24, and optionally a retainer bracket 26. Referring primarily to FIGS. 4 and 6, the brake assembly 10 may also include components that may facilitate movement of the brake pad assemblies 24, such as a brake actuator 30, an operating shaft 32, a yoke 34, a tappet 36, a piston 38, a wear adjuster mechanism 40, a retraction spring 42, or combinations thereof. In addition, the brake assembly 10 may include a sensor assembly 50 that may be in communication with a controller 52. The brake assembly 10 will primarily be described below with a configuration that has one tappet and piston; however, it is contemplated that the brake assembly 10 may be provided with multiple tappets and/or pistons.

Referring to FIG. 1, the brake carrier 20 facilitates mounting of the brake assembly 10 to the vehicle. The brake carrier 20 may be fixedly mounted to a vehicle component. For example, the brake carrier 20 may be directly or indirectly mounted to an axle assembly or a steering knuckle. The brake carrier 20 may receive and support the brake pad assemblies 24 in a manner that permits the brake pad assemblies 24 to move along an axis toward and away from a brake rotor 60 while inhibiting rotation of the brake pad assemblies 24 about the axis. The brake carrier 20 may include a rotor opening that may receive the brake rotor 60. As such, the brake carrier 20 may straddle the brake rotor 60 and help position the brake pad assemblies 24 on opposite sides of the brake rotor 60.

Figure 2:
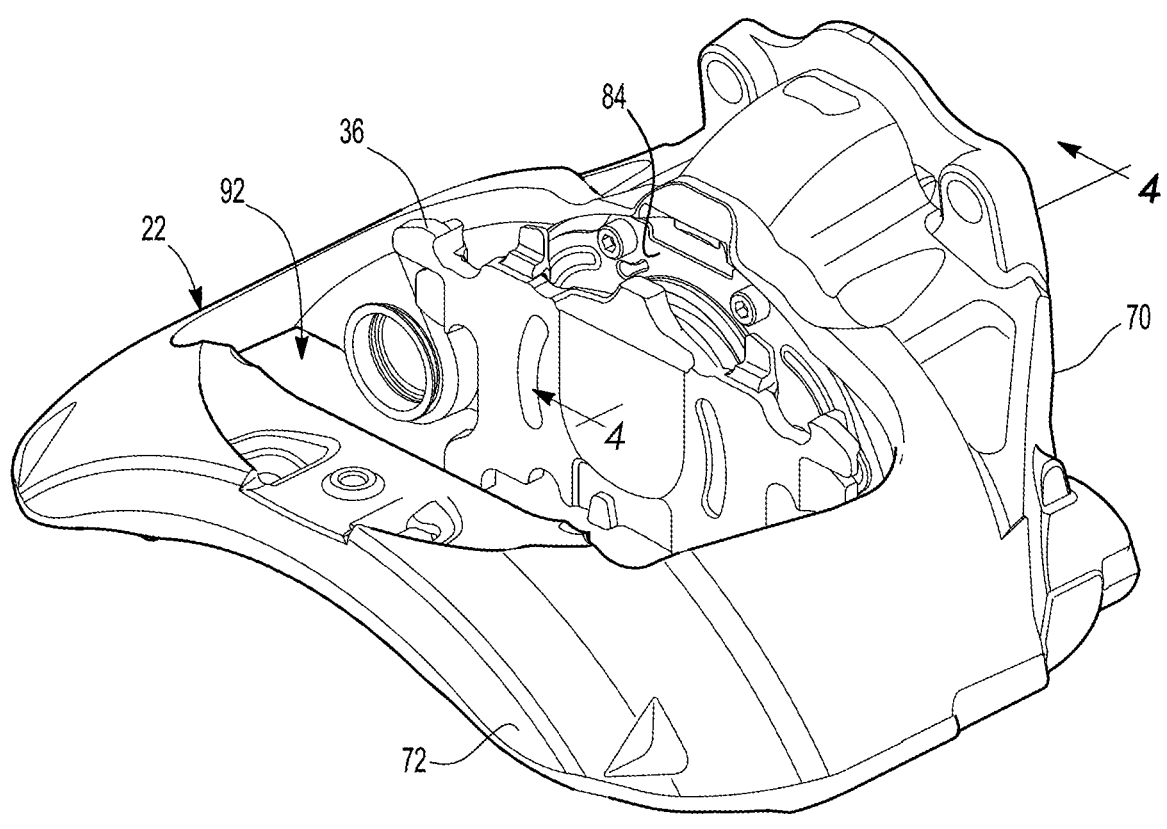
FIG. 2 is a perspective view of a portion of the brake assembly with components such as a brake carrier and brake pad assemblies omitted for clarity.

Referring to FIGS. 1 and 2, the brake caliper 22 is moveably disposed on the brake carrier 20. The brake caliper 22 receives various components of the brake assembly 10. In addition, the brake caliper 22 facilitates positioning of the brake pad assemblies 24 with respect to the brake rotor 60 to facilitate braking of the vehicle. In at least one configuration, the brake caliper 22 may include a caliper housing 70 and a caliper bridge 72.

The caliper housing 70 is moveably disposed on the brake carrier 20. For example, the caliper housing 70 may be slidably disposed on a pair of guide pins that may be fixedly disposed on the brake carrier 20. As is best shown in FIG. 4, the caliper housing 70 may facilitate mounting of the brake actuator 30 and may define a cavity 80 and an opening 82.

The cavity 80 may receive or partially receive various components that facilitate movement of the brake pad assemblies 24, such as the operating shaft 32, yoke 34, tappet 36, piston 38, wear adjuster mechanism 40 and retraction springs 42. The cavity 80 may have an aperture that may face toward the brake rotor 60 and that may be at least partially enclosed by a cover plate 84 that may be fixedly mounted to the caliper housing 70, such as with fasteners like bolts.

The opening 82 may extend from the cavity 80. For instance, the opening 82 may extend through a back side of the caliper housing 70 that may face away from the brake rotor 60. In at least one configuration, a shaft of the brake actuator 30 may extend through the opening 82 to facilitate actuation of the operating shaft 32. The opening 82 may be disposed above an axis 90.

Referring to FIGS. 1 and 2, the caliper bridge 72 may be integrally formed with or may be fixedly disposed on the caliper housing 70. For example, the caliper bridge 72 may be generally C-shaped and may be coupled to the caliper housing 70 with one or more fasteners, such as bolts. In at least one configuration, the caliper bridge 72 may cooperate with the caliper housing 70 to at least partially define an opening 92 that may facilitate insertion and removal of the brake pad assemblies 24.

Referring to FIG. 1, a pair of brake pad assemblies 24 are configured to be received in and supported by the brake carrier 20. The brake pad assemblies 24 may be disposed on opposite sides of the brake rotor 60 and may be engageable with the brake rotor 60 to slow rotation of the brake rotor 60 and an associated wheel about a brake rotor axis of rotation 94. The brake rotor axis of rotation 94 may be offset from and may extend substantially parallel to the axis 90. One brake pad assembly 24 may be positioned between the caliper housing 70 and the brake rotor 60 and may be referred to as an inboard brake pad assembly 24. The brake pad assembly 24 located on the opposite side of the brake rotor 60 may be positioned between the caliper bridge 72 and the brake rotor 60 and may be referred to as an outboard brake pad assembly 24. Each brake pad assembly 24 may include a backplate 100 and friction material 102.

The backplate 100 is a structural member of a brake pad assembly 24. The backplate 100 may be configured as a generally flat plate and may be made of any suitable material, such as metal or a metal alloy. As is best shown in FIG. 4, a side of the backplate 100 that faces away from the friction material 102 may engage or contact the tappet 36.

The friction material 102 is disposed on a side of the backplate 100 that faces toward the brake rotor 60. The friction material 102 may contact the brake rotor 60 during vehicle braking.

Referring to FIG. 1, the retainer bracket 26 may be removably mounted to the brake caliper 22. For example, the retainer bracket 26 may extend across the brake pad assemblies 24 and the opening 92 in the brake caliper 22 to help retain the brake pad assemblies 24 in the brake carrier 20 when the retainer bracket 26 is secured to the brake caliper 22. Conversely, the retainer bracket 26 may be detached from or removed from the brake caliper 22 to permit removal of the brake pad assemblies 24 or installation of the brake pad assemblies 24 via the opening 92.

Referring to FIG. 4, the brake actuator 30 is configured to provide force to actuate the brake pad assemblies 24. The brake actuator 30 may be mounted to the brake caliper 22. In at least one configuration, the brake actuator 30 may be mounted to the back side of the caliper housing 70 and may have a brake actuator shaft that may extend through the opening 82 in the caliper housing 70. The brake actuator shaft may engage the operating shaft 32 and may be moveable to rotate the operating shaft 32.

Referring to FIGS. 4, 6, and 7, the operating shaft 32 may transmit force from the brake actuator 30 other moveable components of the brake assembly 10. In at least one configuration, the operating shaft 32 may generally be configured like an inverted "Y" and may include a lever 110, at least one cam 112, and a tab 114.

Referring to FIG. 4, the lever 110 may extend from the cams 112 toward the opening 82. The lever 110 may have a pocket that may receive an end of the brake actuator shaft.

Referring to FIGS. 6 and 7, the cams 112 may be spaced apart from each other such that a gap 116 is provided between the cams 112. In at least one configuration, the cams 112 may have mirror symmetry with respect to each other. In at least one configuration, a cam 112 may include a concave recess 120 and a convex surface 122.

Figure 5:
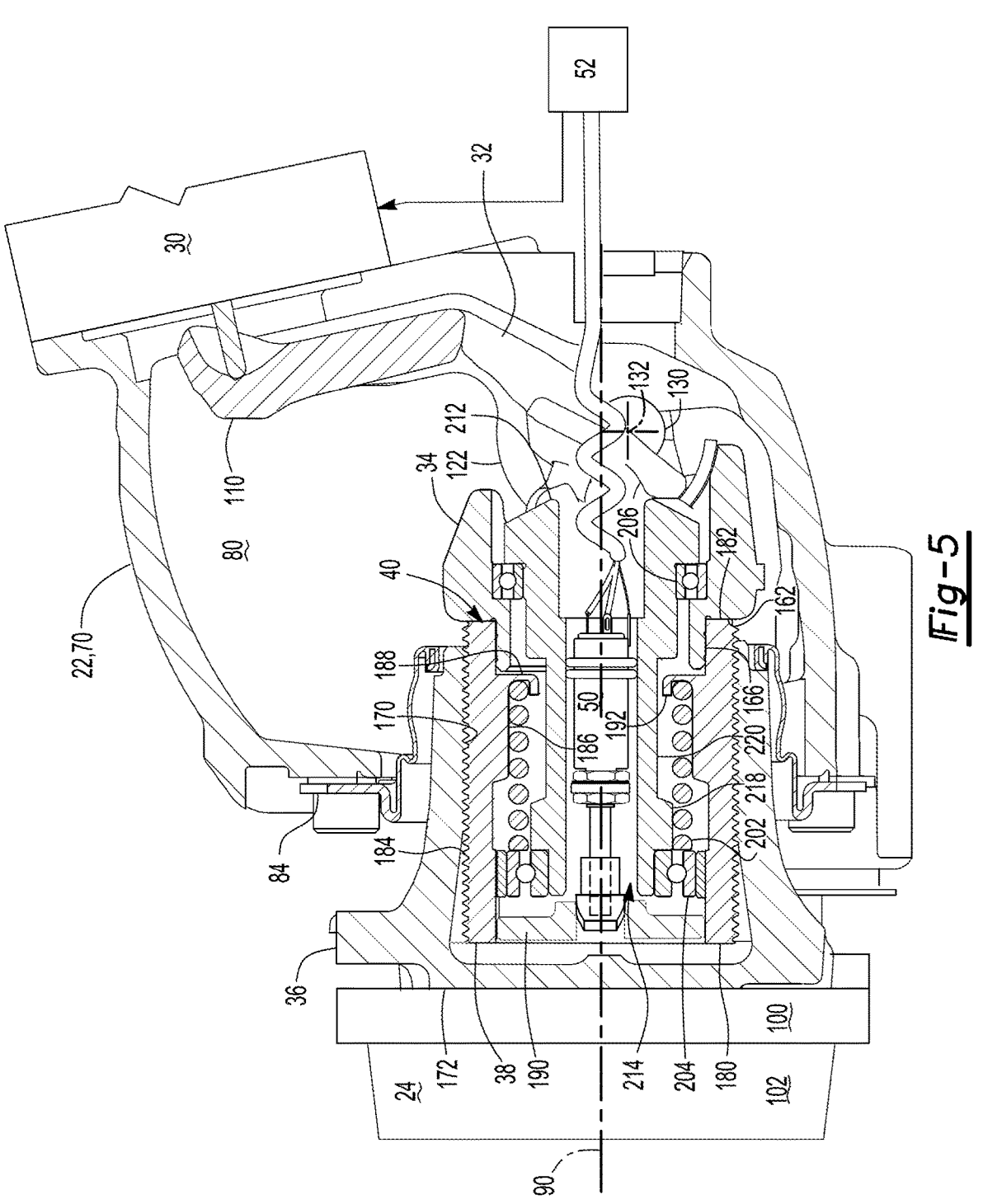
FIG. 5 is a section view showing the tappet in a second position.

Referring to FIG. 7, the concave recess 120 may receive a corresponding roller 130. The roller 130 may be supported by a corresponding arcuate surface in the cavity 80 of the caliper housing 70 and may be rotatable about a roller axis of rotation 132, which is best shown in FIGS. 3-5.

Referring to FIG. 6, the convex surface 122 may be disposed opposite the concave recess 120. The convex surface 122 may engage a corresponding set of roller bearings 140 that may be disposed between the convex surface 122 and the yoke 34. The rollers 130 and roller bearings 140 may facilitate rotation of the operating shaft 32 about an axis of rotation.

Figure 3:
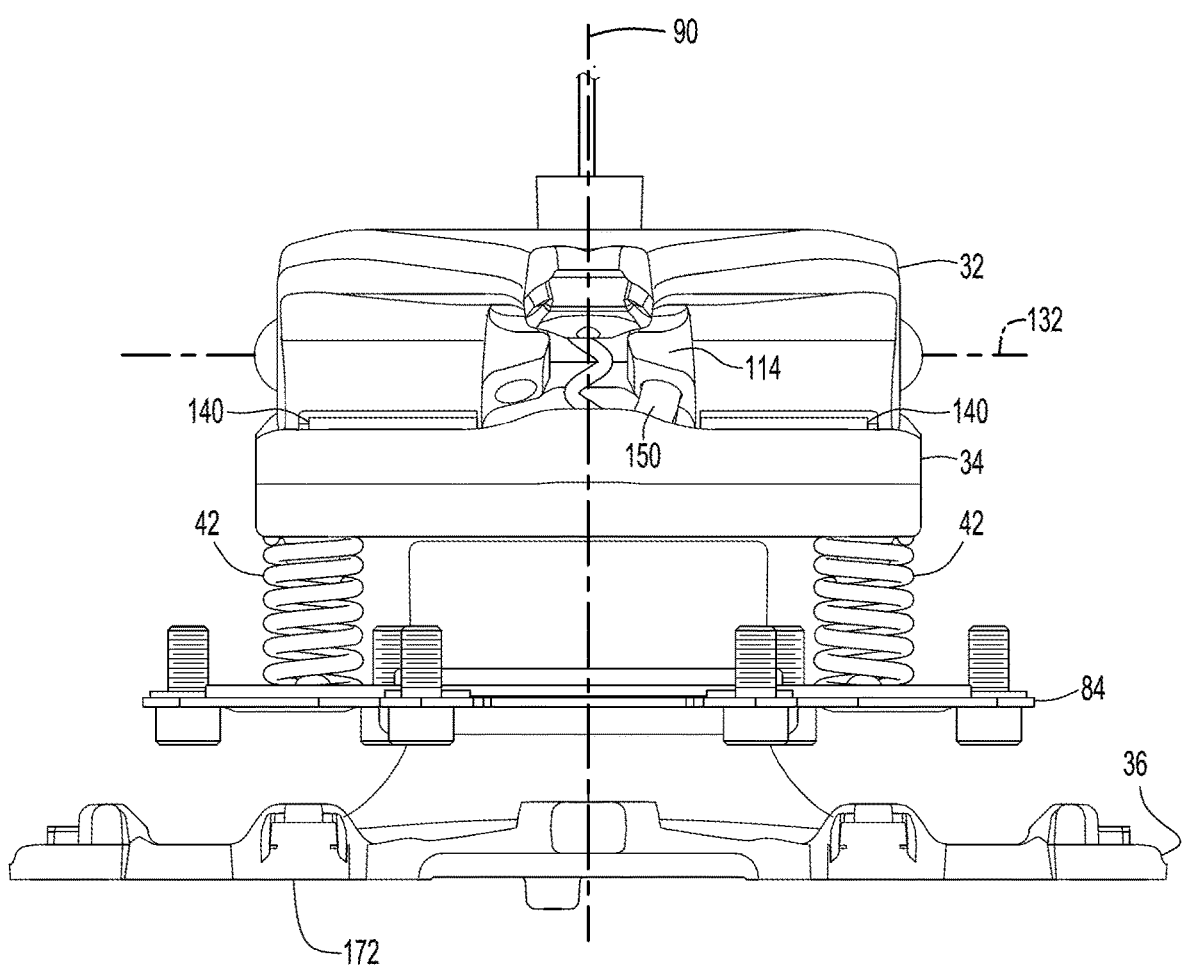
FIG. 3 is a top view of a portion of FIG. 2 with the brake caliper omitted for clarity.

Referring to FIGS. 3 and 6, a tab 114 may extend from at least one of the cams 112 into the gap 116. A ball pin 150 may be fixedly mounted to the tab 114 and may extend toward the wear adjuster mechanism 40 as will be discussed in more detail below. In at least one configuration, the ball pin 150 may have a generally spherical or rounded ball at its distal end.

Referring to FIGS. 4-7, the yoke 34 is disposed between the operating shaft 32 and the piston 38. In at least one configuration, the yoke 34 may include a concave surface 160, an engagement surface 162, a through hole 164, and a ring 166.

Referring primarily to FIG. 6, the concave surface 160 may face toward the operating shaft 32 and may engage the roller bearings 140.

The engagement surface 162 may be disposed opposite the concave surface 160. The engagement surface 162 may engage or contact the piston 38.

The through hole 164 may receive at least a portion of the wear adjuster mechanism 40. In at least one configuration, such as a configuration having a single piston 38, the through hole 164 may be disposed proximate the center of the yoke 34 and may extend around the axis 90.

The ring 166 may encircle a portion of the through hole 164. The ring 166 may protrude from the engagement surface 162 in a direction that extends away from the concave surface 160. The ring 166 may be encircled by an may engage the piston 38.

Referring primarily to FIGS. 4 and 6, the tappet 36 may be moveable along the axis 90 with respect to the caliper housing 70. The brake carrier 20 may inhibit or prevent the tappet 36 from rotating about the axis 90. The tappet 36 may protrude away from the cavity 80 of the caliper housing 70 and may have a generally hollow body that may include an inner thread 170 and an engagement face 172.

The inner thread 170 may face toward the axis 90 and may extend around the axis 90.

The engagement face 172 may face away from the cavity 80. The engagement face 172 may engage or contact the inboard brake pad assembly 24. For example, the engagement face 172 may engage or contact a side of the backplate 100 that may be disposed opposite the friction material 102.

Referring to FIGS. 4, 6, and 7, the piston 38 is at least partially received inside the tappet 36. The piston is rotatable about the axis 90. In addition, the piston 38 may be moveable along the axis 90. In at least one configuration, the piston 38 may have a hollow tubular configuration that may extend from a first piston end 180 to a second piston end 182. As is best shown in FIG. 4, the piston 38 may include an outer thread 184, a piston hub 186, a piston wall 188, and optionally an end cap 190.

The first piston end 180 may face away from the yoke 34 and may face toward the closed end of the tappet 36. As such, the first piston end 180 may face toward the left from the perspective shown in FIG. 4.

The second piston end 182 may be disposed opposite the first piston end 180. As such, the second piston end 182 may face toward the yoke 34, or to the right from the perspective shown in FIG. 4. The second piston end 182 may engage or contact the engagement surface 162 of the yoke 34.

The outer thread 184 may face away from the axis 90 and may extend around the axis 90. The outer thread 184 mates with the inner thread 170 of the tappet 36. As such, the tappet 36 and the piston 38 have mating threads.

The piston hub 186 may be disposed opposite the outer thread 184. As such, the piston hub 186 may face toward the axis 90. In addition, the piston hub 186 may protrude toward the axis 90 or extend further toward the axis 90 than an adjacent inside surface or inside circumferential surface of the piston 38. The piston hub 186 may be axially positioned or positioned with respect to the axis 90 between the first piston end 180 and the second piston end 182. For instance, the piston hub 186 may be spaced apart from the first piston end 180, the second piston end 182, or both. The piston hub 186 may engage a wrap spring 202 of the wear adjuster mechanism 40 as will be discussed in more detail below.

The piston wall 188, if provided, may be disposed opposite the outer thread 184. The piston wall 188 may protrude toward the axis 90. For example the piston wall 188 may protrude further toward the axis 90 than the piston hub 186 but may be spaced apart from a shaft 200 of the wear adjuster mechanism 40. In at least one configuration, the piston hub 186 may extend from the piston wall 188 toward the first piston end 180 or to the left from the perspective shown. In the configuration shown, the piston wall 188 extends substantially perpendicular to the axis 90. The piston wall 188, if provided, may help position and constrain axial movement of a wrap spring 202 of the wear adjuster mechanism 40. For instance, the wrap spring 202 may engage the piston wall 188. However, it is contemplated that the piston wall 188 may be omitted and that the wrap spring 202 may engage another component, such as the yoke 34. Optionally, the piston wall 188 may include a hook portion 192 that may extend away from the yoke 34 and generally toward the first piston end 180. The hook portion 192 may help position the wrap spring 202 or receive a coil of the wrap spring 202 to help center the wrap spring 202 with respect to the axis 90.

Referring to FIGS. 4, 6, and 7, the end cap 190, if provided, may be disposed at an end of the piston 38 that may face toward the brake pad assembly 24 and the tappet 36. The end cap 190 may be integrally formed with the body of the piston 38 or may be provided as a separate component. In the configuration shown, the end cap 190 is provided as a separate component that may be received in the hollow body of the piston 38. The end cap 190 may be fixed to the piston 38 such that the piston 38 is not rotatable with respect to the end cap 190.

Referring to FIG. 4, the wear adjuster mechanism 40 is configured to maintain a desired running clearance between the brake pad assemblies 24 and the brake rotor 60 when the brake pad assemblies 24 are retracted. As an overview, the wear adjuster mechanism 40 may include a bidirectional wrap spring that may permit the axial position of a brake pad assembly along the axis 90 to be adjusted or move closer to the brake rotor 60 in response to wear of the friction material 102. The wear adjuster mechanism 40 is at least partially received inside the piston 38. In at least one configuration and as is best shown with reference to FIGS. 4, 6, and 7, the wear adjuster mechanism 40 includes a shaft 200, a wrap spring 202, a first bearing assembly 204, and a second bearing assembly 206.

The shaft 200 may be at least partially received in the cavity 80 of the caliper housing 70. The shaft 200 may be disposed in the through hole 164 of the yoke 34 and inside the hole or cavity of the piston 38. In addition, the shaft 200 may be spaced apart from the yoke 34 and the piston 38. The shaft 200 may extend from a first shaft end 210 to a second shaft end 212. The shaft 200 may be rotatable about the axis 90 and may define a shaft cavity 214, a ball pin engagement feature 216, a shaft hub 218, and an intermediate shaft surface 220.

Referring primarily to FIGS. 4 and 6, the first shaft end 210 may face away from the yoke 34 and may face toward the closed end of the tappet 36. As such, the first shaft end 210 may face toward the left from the perspective shown in FIG. 4.

The second shaft end 212 may be disposed opposite the first shaft end 210. As such, the second shaft end 212 may face toward the yoke 34, or to the right from the perspective shown in FIG. 4.

The shaft cavity 214 may extend along the axis 90. In at least one configuration, the shaft cavity 214 may be configured as a through hole that may extend along the axis 90 from the first shaft end 210 to the second shaft end 212. A portion of the shaft cavity 214 that may be received inside the yoke 34 may have a larger diameter than a portion of the shaft cavity 214 that may be received inside the piston 38.

Referring primarily to FIG. 6, the ball pin engagement feature 216 may be configured to engage the ball pin 150. The ball pin engagement feature 216 may be disposed proximate the second shaft end 212 and may be offset from the axis 90. In the configuration shown, the ball pin engagement feature 216 is configured as a recess that may receive the ball pin 150. The ball pin 150 may extend at an angle with respect to the axis 90 such that rotation of the operating shaft 32 may cause the ball pin 150 to engage a side or surface of the ball pin engagement feature 216 in a manner that may rotate the shaft 200 about the axis 90. It is also contemplated that the ball pin engagement feature 216 may have a male configuration and the ball pin 150 may have a female configuration in other configurations.

Referring primarily to FIGS. 4 and 6, the shaft hub 218 may face away from the axis 90. In addition, the shaft hub 218 may protrude away from the axis 90 or extend further away from the axis 90 than an adjacent outside surface or outside circumferential surface of the shaft 200. The shaft hub 218 may be axially positioned or positioned with respect to the axis 90 between the first shaft end 210 and the second shaft end 212. For instance, the shaft hub 218 may be spaced apart from the first shaft end 210, the second shaft end 212, or both. The shaft hub 218 may be axially offset from the piston hub 186 such that the piston hub 186 does not encircle the shaft hub 218. The shaft hub 218 may extend from the first bearing assembly 204 in a direction that extends toward the second shaft end 212. The wrap spring 202 engages the shaft hub 218.

The intermediate shaft surface 220 may face away from the axis 90. As such, the intermediate shaft surface 220 may be an outside circumferential surface of the shaft 200. The intermediate shaft surface 220 may be disposed closer to the axis 90 than the shaft hub 218 is disposed to the axis 90. The intermediate shaft surface 220 may extend from the shaft hub 218 toward the second shaft end 212. The intermediate shaft surface 220 may extend axially from an end of the shaft hub 218 toward the second shaft end 212. The piston hub 186 and the wrap spring 202 may encircle the intermediate shaft surface 220. In addition, the piston 38 and the wrap spring 202 may be spaced apart from the intermediate shaft surface 220.

The wrap spring 202 controls relative rotation of the piston 38 and the shaft 200. The wrap spring 202 may be received inside the piston 38 and may encircle or coil around the shaft 200. In addition, the wrap spring 202 may engage or contact the piston 38 and the shaft 200. For instance, the wrap spring 202 may engage or contact the piston hub 186 of the piston 38 and the shaft hub 218 of the shaft 200. The wrap spring 202 may extend axially between the first bearing assembly 204 and the second bearing assembly 206. For instance, the wrap spring 202 may extend from the first bearing assembly 204 to the piston wall 188. The wrap spring 202 may encircle the intermediate shaft surface 220 but may be spaced apart from the intermediate shaft surface 220. In at least one configuration, the wrap spring 202 may not be received inside the through hole 164 or ring 166 of the yoke 34.

Referring to FIG. 4, the wrap spring 202 may be the only component that is positioned between the piston 38 and the shaft 200 in the region that extends axially from the first bearing assembly 204 to the yoke 34. For instance, the wrap spring 202 may be the only component or moveable component that is axially positioned between the first bearing assembly 204 and the yoke 34 and that is radially positioned closer to the axis 90 than the piston 38 and further from the axis 90 than the shaft 200. As such, the present invention may provide a simpler design than other wear adjuster mechanisms and may not include additional wear adjuster mechanism components such as a drum, disc pack, spacer, additional biasing member or spring, or combinations thereof. The wrap spring 202 may be the only component that engages the piston hub 186 and the shaft hub 218.

The amount of surface area of the wrap spring 202 that contacts the piston 38 may differ from the amount of surface area of the wrap spring 202 that contacts the shaft 200. For instance, a first amount of surface area of the wrap spring 202 may contact the piston 38 while a second amount of surface area may contact the shaft 200. The first amount of surface area of the wrap spring 202 that contacts the piston 38 may be greater than the second amount surface area that contacts the shaft 200. This is represented in FIGS. 4 and 5 by the greater number of coils of the wrap spring 202 that engage the piston hub 186 as compared to the shaft hub 218. This surface area difference may help provide different slip torques between the wrap spring 202 and the piston hub 186 and between the wrap spring 202 and the shaft hub 218 as will be discussed in more detail below. The wrap spring 202 is illustrated with a circular cross section but it is contemplated that a different cross section may be provided, such as a square cross section.

Rotation of the shaft 200 in a first rotational direction may exert force on the wrap spring 202 that causes the wrap spring 202 to tighten against the shaft hub 218 to resist or inhibit slipping between the wrap spring 202 and the shaft 200. Rotation of the shaft 200 in a second rotational direction that is opposite the first rotational direction may exert force that causes the wrap spring 202 to tighten against the piston hub 186 to resist or inhibit slipping between the wrap spring 202 and the piston 38.

Referring to FIGS. 4, 6, and 7, the first bearing assembly 204 may rotatably support the piston 38 and the shaft 200. For instance, the first bearing assembly 204 may rotatably support the piston 38 with respect to the shaft 200. The first bearing assembly 204 may be disposed proximate the first shaft end 210 and may encircle the shaft 200. For instance, the first bearing assembly 204 may extend around the shaft 200 and may be received inside the piston 38. As such, the first bearing assembly 204 may extend between the shaft 200 and the inner surface of the piston 38.

The second bearing assembly 206 may rotatably support the shaft 200. The second bearing assembly 206 may be disposed proximate the second shaft end 212 and may encircle the shaft 200. For instance, the second bearing assembly 206 may extend around the shaft 200 and may be received inside the through hole 164 of the yoke 34. As such, the second bearing assembly 206 may extend between the shaft 200 and the yoke 34.

Referring to FIG. 3, at least one retraction spring 42 may be provided to facilitate retraction of the brake pad assemblies 24. In the configuration shown, a pair of retraction springs 42 are provided. The retraction springs 42 may be received in the cavity 80 of the caliper housing 70 and may extend from the yoke 34 to the cover plate 84. The retraction springs 42 may be configured to actuate the yoke 34 away from the cover plate 84 since the cover plate 84 is fixed to the caliper housing 70. As such, the retraction springs 42 may urge the yoke 34 to move along the axis 90 in a direction that extends away from the brake rotor 60 and the cover plate 84.

Referring primarily to FIG. 4, the sensor assembly 50 may be received inside the shaft 200. For example, at least a portion of the sensor assembly 50 may be received inside the shaft cavity 214. The sensor assembly 50 may provide a signal that may be indicative of rotation of the shaft 200 about the axis 90.

Referring to FIG. 4, the controller 52 may monitor and control operation of the brake assembly 10. For instance, the controller 52 may monitor and control operation of the brake actuator 30. The controller 52 may be of any suitable type, such as a multiprocessor-based controller. The controller 52 may also process signals or data from various input devices, such as the sensor assembly 50 and one or more input devices, such as a brake pedal sensor or another sensor that may trigger braking of the vehicle, such as an adaptive cruise control system or a proximity sensor that may detect an object or obstruction in front of the direction of travel of the vehicle.

Referring to FIG. 4, operation of the brake assembly 10 will now be described in more detail. As an overview, the brake assembly 10 may start in a retracted state in which braking of the vehicle is not requested. As such, the brake pad assemblies 24 may be retracted away from the brake rotor 60 and components of the brake assembly 10 may be positioned as shown.

In response to a vehicle braking command, such as may be provided by an input device, the controller 52 may initiate braking of the vehicle. The controller 52 may operate the brake actuator 30 to extend the brake actuator shaft, thereby rotating the operating shaft 32 about its axis of rotation in a first direction or a counterclockwise direction from the perspective shown. Rotation of the operating shaft 32 may move the yoke 34, tappet 36, piston 38, wear adjuster mechanism 40, and the inboard brake pad assembly 24 that is disposed adjacent to the tappet 36 along the axis 90 toward the brake rotor 60, or to the left from the perspective shown. Movement of the yoke 34 toward the brake rotor 60 may compress the retraction springs 42. In addition, rotation of the operating shaft 32 may cause the ball pin 150 to engage the ball pin engagement feature 216 of the shaft 200, which may provide torque that rotates the shaft 200 about the axis 90. Once the inboard brake pad assembly 24 contacts the brake rotor 60, a reaction force may then move the brake caliper 22 with respect to the brake carrier 20 to actuate the outboard brake pad assembly 24 that is disposed between the brake rotor 60 and the caliper bridge 72 into engagement with an opposite side of the brake rotor 60 to help slow rotation of the brake rotor 60 and an associated vehicle wheel. Retracting the brake actuator shaft may allow the operating shaft 32 to rotate about its axis of rotation in a clockwise direction from the perspective shown, which in turn may allow the actuation sequence to proceed in reverse under the biasing force of the retraction springs 42.

Rotation of the operating shaft 32 may or may not result in adjustment of the running clearance between the brake pad assembly 24 and the brake rotor 60. For example, rotation of the operating shaft 32 in the first direction about its axis of rotation may operate the wear adjuster mechanism 40 to extend the tappet 36 closer to the brake rotor 60 with respect to the piston 38 when the operating shaft 32 and the ball pin 150 rotate the shaft 200 in a first rotational direction about the axis 90 before the inboard brake pad assembly 24 contacts the brake rotor 60. As such, the shaft 200 and the wrap spring 202 may rotate together about the axis 90 in the first rotational direction and the wrap spring 202 may tighten against the shaft 200 to inhibit the wrap spring 202 from slipping with respect to the shaft 200. Rotation of the wrap spring 202 may cause the piston 38 to rotate about the axis 90 in the first rotational direction due to the friction between the wrap spring 202 and the piston hub 186. Rotation of the piston 38 may extend the tappet 36 (i.e., extend the tappet 36 further away from the yoke 34 and closer to the brake rotor 60) due to relative rotation of the outer thread 184 of the piston 38 and the inner thread 170 of the tappet 36. For example, rotation of the piston 38 may cause the tappet 36 to extend when the inboard brake pad assembly 24 has not contacted the brake rotor 60 due to operation of the mating threads and because the tappet 36 is inhibited from rotating about the axis 90 by the brake carrier 20 (i.e., the brake carrier 20 prevents the inboard brake pad assembly 24 and thus the tappet 36 from merely rotating with the piston 38). An example of extension of the tappet 36 to reduce the running clearance is shown in FIG. 5.

Referring to FIG. 5, extension of the tappet 36 with respect to the piston 38 may stop when the inboard brake pad assembly 24 contacts the brake rotor 60. For example, the torque required to rotate the piston 38 increases substantially when the inboard brake pad assembly 24 contacts the brake rotor 60 even when the brake actuator 30 continues to rotate the operating shaft 32 and hence continues to rotate the shaft 200. As a result, the torque exerted in the first rotational direction becomes sufficient to cause the wrap spring 202 and the piston 38 to slip with respect to each other, thereby permitting rotation of the shaft 200 and the wrap spring 202 to rotate with respect to the piston 38.

The wear adjuster mechanism 40 may operate to hold the tappet 36 in its adjusted position when the brake pad assemblies 24 are retracted. For example, when the brake actuator 30 is retracted the operating shaft 32 may rotate in a second direction that is disposed opposite the first direction, or clockwise from the perspective shown. The ball pin 150 may then rotate the shaft 200 in the opposite direction or in a second rotational direction about the axis 90 and back toward its previous rotational position. Rotation of the shaft 200 in the second rotational direction loosens the wrap spring 202 from the shaft hub 218 and tightens the wrap spring 202 against the piston hub 186. As a result, the wrap spring 202 may inhibit rotation of the piston 38 about the axis 90 (and hence inhibit relative rotation between the piston 38 and the tappet 36) while the wrap spring 202 may slip with respect to the shaft hub 218, thereby allowing the shaft 200 to rotate about the axis 90 in the second rotational direction with respect to the wrap spring 202 and back to its previous position.

Rotation of the operating shaft 32 may not result in adjustment of the running clearance between the brake pad assembly 24 and the brake rotor 60 when the inboard brake pad assembly 24 contacts the brake rotor 60 before the operating shaft 32 and the ball pin 150 rotate the shaft 200 about the axis 90. As previously discussed, the torque required to rotate the piston 38 increases substantially when the inboard brake pad assembly 24 contacts the brake rotor 60. As a result, the wrap spring 202 and the shaft 200 may slip with respect to each other as the operating shaft 32 rotates in the first direction, thereby permitting rotation of the shaft 200 with respect to the piston 38 while rotation of the piston 38 is opposed by the tappet 36 reacting against the brake rotor 60. Thus, the wear adjuster mechanism 40 may operate to hold the tappet 36 in its current position with respect to the piston 38 when the brake pad assemblies 24 are retracted.

It is noted that in FIGS. 4 and 5 there is little visible movement of the wrap spring 202 since at least one coil of the wrap spring 202 remains engaged with the piston hub 186 and at least one coil of the wrap spring 202 remains engaged with the shaft hub 218 when the wrap spring is rotated in both the first rotational direction and the second rotational direction.

In summary, the wrap spring 202 is configured to slip with respect to the piston 38 but not with respect to the shaft 200 when the wrap spring 202 is rotated and a first rotational direction about the axis 90. However, the wrap spring 202 may slip with respect to the piston 38 when sufficient torque is applied to the shaft 200 in the first rotational direction. This sufficient torque at which slip occurs with respect to the piston 38 is designated a first amount of torque. Conversely, the wrap spring 202 is configured to slip with respect to the shaft 200 but not with respect to the piston 38 when the wrap spring 202 is rotated in the second rotational direction about the axis 90. However, the wrap spring 202 may slip with respect to the shaft 200 when sufficient torque is applied in the second rotational direction. The sufficient torque at which slip occurs with respect to the shaft 200 is designated a second amount of torque. The first amount of torque may be greater than the second amount of torque. For instance, the first amount of torque may be two or more times greater than the second amount of torque. Thus, the slip torque between the wrap spring 202 and the piston hub 186 may be greater than the slip torque between the wrap spring and the shaft hub 218.

The brake assembly and method of control as discussed above may allow a wrap spring to bidirectionally control torque transmission, which results in a simpler wear adjustment mechanism design with fewer parts, lower cost, and easier assembly. For instance, the present invention may use one wrap spring to control torque in both rotational directions rather than different mechanisms to control torque in each rotational direction, such as a multi-plate clutch and a spring. The present invention allows different slip torques to be provided between a piston and a shaft and allows these slip torques to be provided in different rotational directions. In addition, use of a bidirectional wrap spring may provide a high torque-to-size ratio, provide accurate and repeatable torque transmission, have lower power consumption, and provide a long life. Additionally, a wrap spring may also be configured to apply a bearing preload against one or more bearing assemblies of the wear adjustment mechanism, thereby helping avoid spinning of the bearing assembly and improving bearing life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A brake assembly comprising:
a brake caliper;
a tappet that is moveable along an axis with respect to the brake caliper and that is adapted to engage a brake pad assembly, wherein the tappet has an inner thread;
a piston that is rotatable about the axis and is at least partially received in the tappet, wherein the piston has an outer thread that mates with the inner thread; and a wear adjuster mechanism that is at least partially received inside the piston, wherein the wear adjuster mechanism includes:

a shaft that is rotatable about the axis; and a wrap spring that is received entirely inside the piston and that encircles the shaft, wherein the wrap spring engages the piston and the shaft, the wrap spring is configured to slip with respect to the piston but not slip with respect to the shaft when the wrap spring is rotated about the axis in a first rotational direction, and the wrap spring is configured to slip with respect to the shaft but not slip with respect to the piston when the wrap spring is rotated about the axis in a second rotational direction that is disposed opposite the first rotational direction, wherein the wrap spring contacts the piston and the shaft and a first amount of surface area of the wrap spring that contacts the piston is greater than a second amount of surface area of the wrap spring that contacts the shaft.

2. The brake assembly of claim 1 wherein the piston has a piston hub that is disposed opposite the outer thread and that protrudes toward the axis, wherein the wrap spring engages the piston hub.

3. The brake assembly of claim 2 wherein the piston has a piston wall that is disposed opposite the outer thread and that protrudes further toward the axis than the piston hub.

4. The brake assembly of claim 3 wherein the wrap spring engages the piston wall.

5. The brake assembly of claim 4 further comprising a first bearing assembly that is disposed inside the piston and that rotatably supports the piston with respect to the shaft, wherein the wrap spring extends from the first bearing assembly.

6. The brake assembly of claim 3 wherein the piston has a first piston end and a second piston end disposed opposite the first piston end, wherein the piston hub is spaced apart from the first piston end and the second piston end.

7. The brake assembly of claim 6 wherein the piston hub extends from the piston wall toward the first piston end of the piston.

8. The brake assembly of claim 1 wherein the shaft has a shaft hub that protrudes away from the axis, and the wrap spring engages the shaft hub.

9. The brake assembly of claim 8 further comprising a first bearing assembly that is disposed inside the piston and that rotatably supports the piston on the shaft, wherein the shaft hub extends from the first bearing assembly.

10. The brake assembly of claim 8 wherein the piston has a piston hub that is disposed opposite the outer thread and that protrudes toward the axis, the wrap spring engages the piston hub, and the shaft hub is axially offset from the piston hub such that the piston hub does not encircle the shaft hub.

11. The brake assembly of claim 10 wherein the shaft has a first shaft end and a second shaft end disposed opposite the first shaft end, wherein the shaft hub is spaced apart from the first shaft end and the second shaft end.

12. The brake assembly of claim 11 wherein the shaft has an intermediate shaft surface that faces away from the axis, wherein the shaft hub extends further away from the axis than the intermediate shaft surface extends away from the axis, and the intermediate shaft surface extends from the shaft hub toward the second shaft end.

13. The brake assembly of claim 12 wherein the wrap spring encircles the intermediate shaft surface and is spaced apart from the intermediate shaft surface.

14. The brake assembly of claim 12 wherein the piston hub encircles the intermediate shaft surface.

15. The brake assembly of claim 1 further comprising a first bearing assembly that is disposed inside the piston and that rotatably supports the shaft with respect to the piston, and a second bearing assembly that is disposed inside a yoke and that rotatably supports the shaft with respect to the yoke, wherein the wrap spring is the only component that is positioned between the piston and the shaft, that is axially positioned between the first bearing assembly and the yoke, and that is positioned closer to the axis than the piston and further from the axis than the shaft.

16. A method of controlling a brake assembly, the method comprising:

rotating a shaft in a first rotational direction about an axis, the shaft being disposed inside a piston that is rotatable about the axis and that is received in a tappet that is moveable along the axis with respect to a brake caliper and that is adapted to engage a brake pad assembly, the tappet and piston having mating inner and outer threads, respectively, wherein a wrap spring is received inside the piston and engages the piston and the shaft; and wherein rotating the shaft in the first rotational direction tightens the wrap spring against the shaft such that the wrap spring does not slip with respect to the shaft and such that the wrap spring slips with respect to the piston when sufficient torque is applied to the shaft in the first rotational direction, wherein the wrap spring contacts the piston and the shaft and a first amount of surface area of the wrap spring that contacts the piston is greater than a second amount of surface area of the wrap spring that contacts the shaft.

17. The method of claim 16 further comprising rotating the shaft in a second rotational direction, wherein rotating the shaft in the second rotational direction tightens the wrap spring against the piston such that the wrap spring does not slip with respect to the piston and such that the wrap spring slips with respect to the shaft when sufficient torque is applied in the second rotational direction, wherein the second rotational direction is opposite the first rotational direction.

18. The method of claim 17 wherein the wrap spring slips with respect to the piston when a first amount of torque is applied in the first rotational direction, and the wrap spring slips with respect to the shaft when a second amount of torque is applied in the second rotational direction, wherein the second amount of torque is less than the first amount of torque.

* * * * *